Oct. 11, 1949.　　　　　　V. C. CASS　　　　　　2,484,447
VEHICLE WHEEL MOUNTING MEANS
Filed July 27, 1946　　　　　　　　　　　　　　　2 Sheets-Sheet 1

INVENTOR.
Vernon C. Cass
BY
David Manly Heller
Atty.

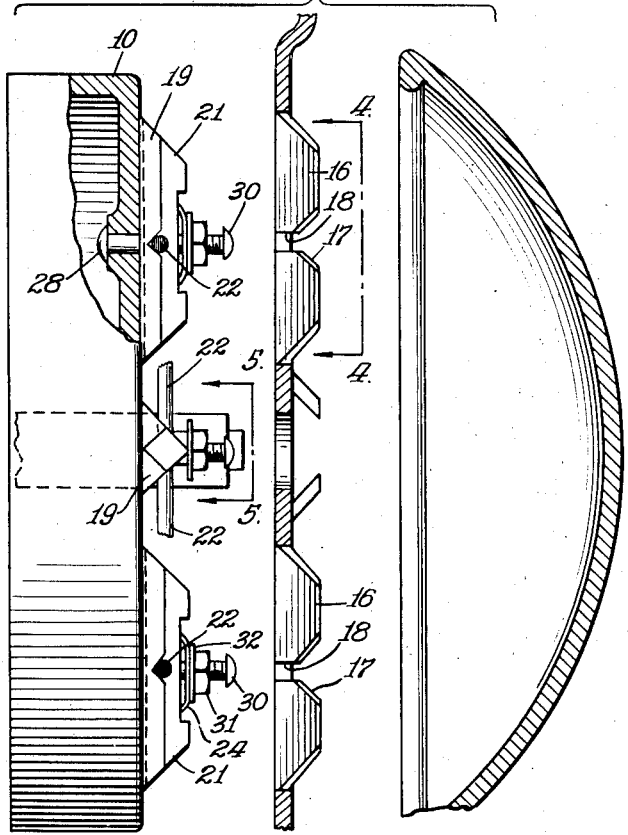
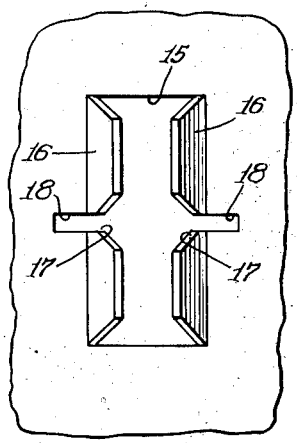
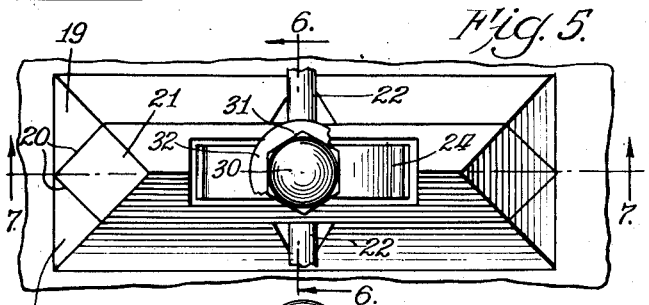
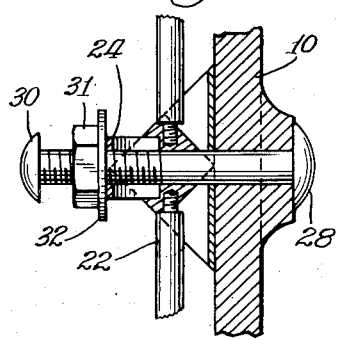
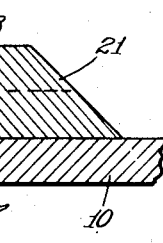

Patented Oct. 11, 1949

2,484,447

UNITED STATES PATENT OFFICE 2,484,447

VEHICLE WHEEL MOUNTING MEANS

Vernon C. Cass, Chicago, Ill.

Application July 27, 1946, Serial No. 686,745

8 Claims. (Cl. 301—9)

My invention relates to means for mounting vehicle wheels on the motivating element supporting the said wheels.

An important object of my invention is to provide means for locking a vehicle wheel onto its motivating support, utilizing locking means which is, at all times, secured to the hub structure, and which is manipulated by raising the same out of the locked position, motivating it to an arcuate distance of 90 degrees for locking the wheel in place. A multiplicity of such locking units are provided on the hub structure. Thus, in removing a wheel, there are no loose parts which can be lost or misplaced, the entire arrangement being compactly assembled and permitting the removal, or attachment of a vehicle wheel to its respective mounting on the hub without removing any part from the assembly.

Another object of my invention is to provide a mounting means for vehicle wheels of the afore-mentioned character, which utilizes no loose parts, or connections, which is practical and efficient in its construction and operation, and which is of such simple arrangement and assemblage of parts so to permit economical manufacture thereof in quantity production.

Other features, advantages, and objects inherent in my invention will become apparent from an examination of the accompanying drawings, bearing further elucidation in the ensuing description, wherein like symbols are used to designate like parts, and in which;

Fig. 3 is an exploded view showing the elemental structure of the various parts comprising my invention.

Fig. 4 is a view looking in the direction of arrows 4—4 on Fig. 3.

Fig. 5 is a view looking in the direction of arrows 5—5 on Fig. 3.

Fig. 6 is a cross-sectional view taken, substantially, on the line 6—6 of Fig. 5.

Fig. 7 is a cross-sectional view taken, substantially, on the line 7—7 of Fig. 5.

Figures 1, 2:
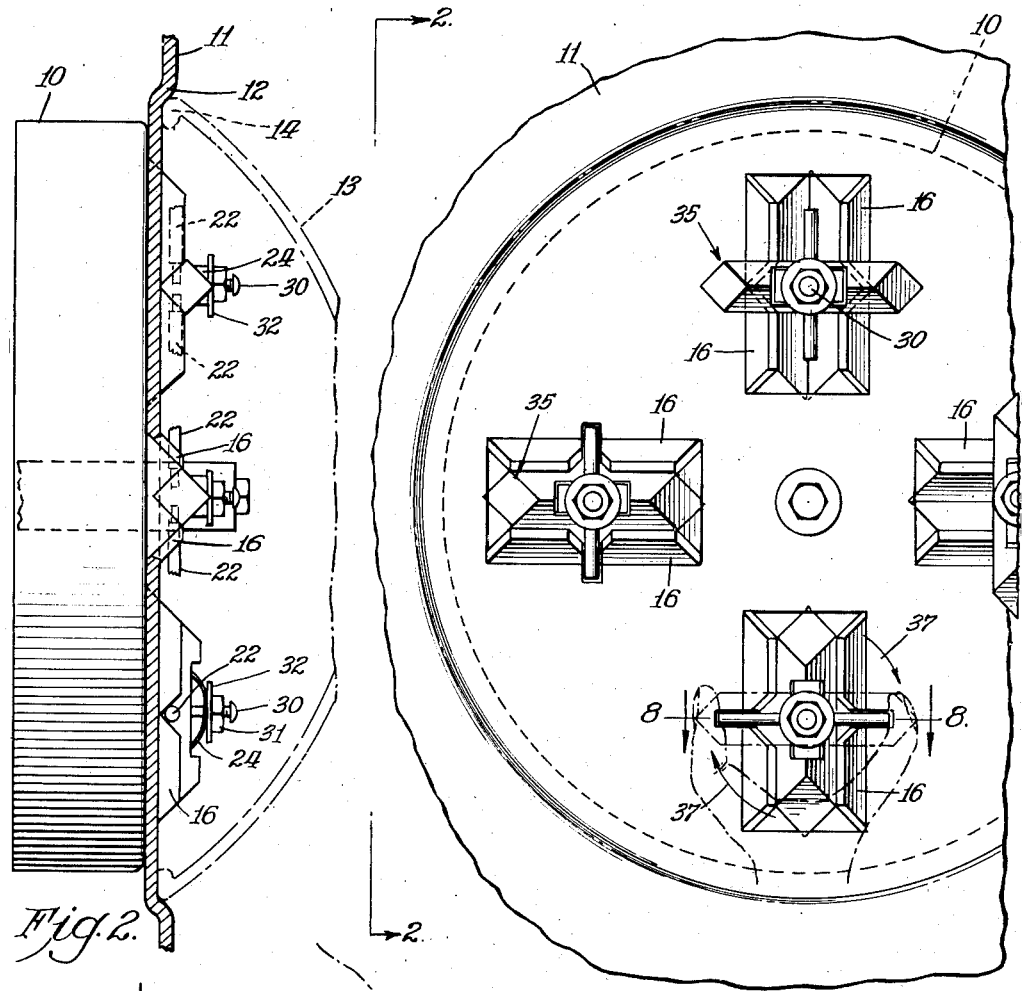
Fig. 1 is a top view of my invention with the hub cap shown in phantom, so that the interior structure may be more clearly depicted and illustrated.
Fig. 2 is a view looking in the direction of arrows 2—2 on Fig. 1.

Referring to the various views, my invention is generally designated 9, and consists of a wheel structure 11, having an indentation, or depression 12 of circular configuration, in order to receive in snap engagement and attachment the decorative, or ornate hub cap 13 provided with a strengthened flange portion 14 for engagement with the indentation or recess 12, so that the same can be readily attached, or pried off, when it is necessary to attach, or remove a wheel drum 11, from the motivating hub 10, operated and motivated by a prime mover, such as the engine of the automobile, and connected through the differential gearing.

The wheel 11 is, therefore, provided with the angular lip portions 16 formed out of the drum structure, thus leaving an opening, or recess 15. The lips 16 are provided with angular cut-out portions 17 for cradling the lock bars 21 used in each of the multiplicity of clamping arrangements provided on the hub, and generally designated 35. An elongated slotted portion 18 is provided to furnish clearance for the pins 22 to permit removal of the wheel drum. The clamp bars 21, referring to Figs. 5, 6, 7, and 8, are more clearly illustrated in enlarged position, and indicate the following relative structural relationship of parts. The locking bolt 21 is preferably of square cross-section, providing an angular portion at the bottom to cradle in inoperative position in the recesses 20, formed on the integrally attached formation 19 on the hub 10. The said portions 19 are provided with angular recesses 34 in transverse relationship to the cradling portion 20, so as to support the locking bolt 21 when motivated through an arcuate movement of 90 degrees as indicated by the arrows 37, subsequently to the lifting action in a direction upwardly, as indicated by the arrow 36 Figs. 1 and 8 respectively.

The bolt element 21 is provided with two pin elements 22, which are preferably knurled at the ends, to furnish a convenient grip for the fingers of the hand when the bolt 21 is to be motivated to operative or inoperative position. The bolt is also provided with a central pocket portion 23, which is adapted to house the flexible resilient spring element 24, having the ends 25 short of the magnitude of the pocket 23, so as to allow movement of the spring 24 during the flexing action to which it may be subjected, as will hereinafter be more elaborately elucidated.

The spring 24 is provided with an enlarged, or elongated slotted opening 33 to permit equalizing action within the pocket 23, the entire structure being supported on the bolt 27, having the headed portion 28 firmly secured to the projection 29 on the hub 10, the remainder of the hub being bored out at 26, the bolt being also threaded and headed as shown at 30 at the top. On the bolt is mounted a lock nut 31, and a washer 32 is intermediately mounted between the spring 24 and the lock nut 31.

In order to attach or remove a wheel, it is necessary that the lock bolt 21 be in the position indicated in Fig. 5. Thus, all of the lips 16 will be free from engagement with the bolts 21, the pins 22 being of such length as to clear the slotted portion 18. Thus, the wheel may be removed from its mooring.

Figure 8:
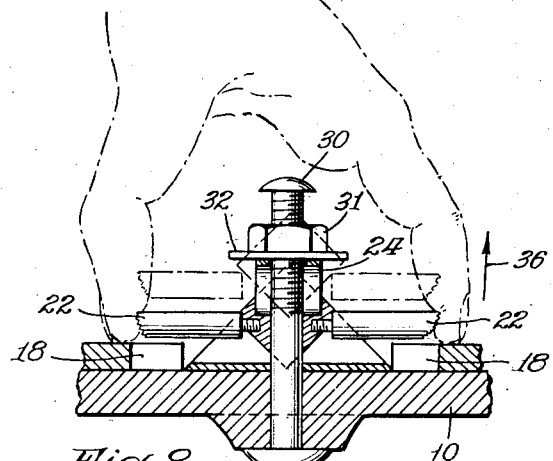
Fig. 8 is a cross-sectional view taken, substantially, on the line 8—8 of Fig. 1.

In attaching the wheel, the wheel is merely located on the hub by means of its lip portions 16 being located respectively on the hub angular extensions 19; the bolts 21 are successively lifted, as indicated by the arrow 36, Fig. 8, and then motivated as indicated by the arrow 37, Fig. 1, through an angular magnitude of 90 degrees, hence causing the bolts to lock in position, as indicated in the upper portion of Fig. 1, where the bolt is shown in locked position, and immediately to the left thereof, where a bolt is shown in open position.

Thus, the locking of the wheel 11 to the hub 10 is effectuated, and the reverse of that procedure is used for removal of the wheel. The cap 13 is then snapped into engagement with the wheel recess 12 and the operation is complete. Thus, when the mounting means, comprising my invention, has to be resorted to or operated upon, at times, such as at night, when little light is available, and artificial illumination must be resorted to, no part can be misplaced, or lost, and the operation can be very efficiently performed.

Although I have indicated a construction showing four lock bolts, six or more may be used, or if found sufficient, three only may be used. Any suitable number may be used when actual manufacture is attempted, and the proper engineering calculations made showing the number of lock bolts most effectively required for the results to be attained thereby.

An important feature of my invention is that the bolts used for locking, or unlocking the wheel to the hub require rather simple manipulation, require no special tools or instruments for attachment or removal of the same, hence furnishing an ideal attachment, and detachment, structure for vehicle wheels with respect to the motivating elements on which they are supported.

Although I have illustrated and described certain preferred embodiments of my device, I realize and appreciate that my invention is susceptible of broad application, hence I do not desire to be limited to the precise structure shown and described; my invention to be limited only by the subjoined, or appended claims.

Having thus described and revealed my invention, what I claim as novel, and desire to secure by Letters Patent, is:

1. Fastening means for securing two elements having surfaces in intimate contact comprising, a primary element provided with a multiplicity of angularly formed cradle portions having also angularly formed cradle notches transverse to the said cradle portions, bolt means secured to the said primary element centrally of the said cradle portions, clamp bars of polygonal cross-section presenting an angular formation thereof in mating engagement with the said cradle portions when in inoperative position, and being slidably and rotatably attached to the said bolt means, the said clamp bars being in operative position when in engagement with the said cradle notches, and lock nut means secured to the said bolt means adapted to retain the said clamp bars in locked and operative position; and a secondary element provided with lips adapted to locate removably on the outer portions of the said cradle portions, the said lips being provided with transverse notches in registry with the said cradle notches.

2. Fastening means for securing two elements having surfaces in intimate contact comprising, a primary element provided with a multiplicity of angularly formed cradle portions having also angularly formed cradle notches transverse to the said cradle portions, bolt means secured to the said primary element centrally of the said cradle portions, clamp bars of polygonal cross-section presenting an angular formation thereof in mating engagement with the said cradle portions when in inoperative position, and being slidably and rotatably attached to the said bolt means, the said clamp bars being in operative position when in engagement with the said cradle notches, and lock nut means secured to the said bolt means adapted to retain the said clamp bars in locked and operative position; and a secondary element provided with lips adapted to locate removably on the outer portions of the said cradle portions, the said lips being provided with transverse notches in registry with the said cradle notches, and resilient means mounted intermediate the said clamp bars and the said lock nut means.

3. Fastening means for securing two elements having surfaces in intimate contact comprising, a primary element provided with a multiplicity of angularly formed cradle portions having also angularly formed cradle notches transverse to the said cradle portions, bolt means secured to the said primary element centrally of the said cradle portions, clamp bars of polygonal cross-section presenting an angular formation thereof in mating engagement with the said cradle portions when in inoperative position, and being slidably and rotatably attached to the said bolt means, the said clamp bars being in operative position when in engagement with the said cradle notches, and lock nut means secured to the said bolt means adapted to retain the said clamp bars in locked and operative position; and a secondary element provided with lips adapted to locate removably on the outer portions of the said cradle portions, the said lips being provided with transverse notches in registry with the said cradle notches, the said clamp bars being provided with transverse pin handle means, the said secondary element being further provided with elongated slots at the apices of its cradle notches to furnish clearance for the removal of the said secondary element from the said primary element.

4. Fastening means for securing two elements having surfaces in intimate contact comprising, a primary element provided with a multiplicity of angularly formed cradle portions having also angularly formed cradle notches transverse to the said cradle portions, bolt means secured to the said primary element centrally of the said cradle portions, clamp bars of polygonal cross-section presenting an angular formation thereof in mating engagement with the said cradle portions when in inoperative position, and being slidably and rotatably attached to the said bolt means, the said clamp bars being in operative position when in engagement with the said cradle notches, and lock nut means secured to the said bolt means adapted to retain the said clamp bars in locked and operative position; and a secondary element provided with lips adapted to locate removably on the outer portions of the said cradle portions, the said lips being provided with transverse notches in registry with the said cradle notches, and resilient means mounted intermediate the said clamp bars and the said lock nut means, the said clamp bars being provided with transverse pin handle means, the said secondary element being further provided with elongated slots at the apices of its cradle notches to furnish clearance for the removal of the said secondary element from the said primary element.

5. Fastening means for securing two elements having surfaces in intimate contact comprising, a primary element provided with a multiplicity of angularly formed cradle portions having also angularly formed cradle notches transverse to the said cradle portions, bolt means secured to the said primary element centrally of the said cradle portions, clamp bars of polygonal cross-section presenting an angular formation thereof in mating engagement with the said cradle portions when in inoperative position, and being slidably and rotatably attached to the said bolt means, the said clamp bars being in operative position when in engagement with the said cradle notches, and lock nut means secured to the said bolt means adapted to retain the said clamp bars in locked and operative position; and a secondary element provided with lips adapted to locate removably on the outer portions of the said cradle portions, the said lips being provided with transverse notches in registry with the said cradle notches, the said secondary element also being provided with an indentation of circular configuration; and a cap secured in snap engagement removably to the said indentation.

6. Fastening means for securing two elements having surfaces in intimate contact comprising, a primary element provided with a multiplicity of angularly formed cradle portions having also angularly formed cradle notches transverse to the said cradle portions, bolt means secured to the said primary element centrally of the said cradle portions, clamp bars of polygonal cross-section presenting an angular formation thereof in mating engagement with the said cradle portions when in inoperative position, and being slidably and rotatably attached to the said bolt means, the said clamp bars being in operative position when in engagement with the said cradle notches, and lock nut means secured to the said bolt means adapted to retain the said clamp bars in locked and operative position; and a secondary element provided with lips adapted to locate removably on the outer portions of the said cradle portions, the said lips being provided with transverse notches in registry with the said cradle notches, and resilient means mounted intermediate the said clamp bars and the said lock nut means, the said secondary element also being provided with an indentation of circular configuration; and a cap secured in snap engagement removably to the said indentation.

7. Fastening means for securing two elements having surfaces in intimate contact comprising, a primary element provided with a multiplicity of angularly formed cradle portions having also angularly formed cradle notches transverse to the said cradle portions, bolt means secured to the said primary element centrally of the said cradle portions, clamp bars of polygonal cross-section presenting an angular formation thereof in mating engagement with the said cradle portions when in inoperative position, and being slidably and rotatably attached to the said bolt means, the said clamp bars being in operative position when in engagement with the said cradle notches, and lock nut means secured to the said bolt means adapted to retain the said clamp bars in locked and operative position; and a secondary element provided with lips adapted to locate removably on the outer portions of the said cradle portions, the said lips being provided with transverse notches in registry with the said cradle notches, the said clamp bars being provided with transverse pin handle means, the said secondary element being further provided with elongated slots at the apices of its cradle notches to furnish clearance for the removal of the said secondary element from the said motivating hub, the said secondary element also being provided with an indentation of circular configuration; and a cap secured in snap engagement removably to the said indentation.

8. Fastening means for securing two elements having surfaces in intimate contact comprising, a primary element provided with a multiplicity of angularly formed cradle portions having also angularly formed cradle notches transverse to the said cradle portions, bolt means secured to the said primary element centrally of the said cradle portions, clamp bars of polygonal cross-section presenting an angular formation thereof in mating engagement with the said cradle portions when in inoperative position, and being slidably and rotatably attached to the said bolt means, the said clamp bars being in operative position when in engagement with the said cradle notches, and lock nut means secured to the said bolt means adapted to retain the said clamp bars in locked and operative position; and a secondary element provided with lips adapted to locate removably on the outer portions of the said cradle portions, the said lips being provided with transverse notches in registry with the said cradle notches, and resilient means mounted intermediate the said clamp bars and the said lock nut means, the said clamp bars being provided with transverse pin handle means, the said secondary element being further provided with elongated slots at the apices of its cradle notches to furnish clearance for the removal of the said secondary element from the said primary element, the said secondary element also being provided with an indentation of circular configuration; and a cap secured in snap engagement removably to the said indentation.

VERNON C. CASS.

REFERENCES CITED

The following references are of record in the file of this patent:

UNITED STATES PATENTS

| Number | Name | Date |
| --- | --- | --- |
| 1,939,114 | Ficken | Dec. 12, 1933 |
| 2,216,385 | Chobert | Oct. 1, 1940 |
| 2,409,602 | Vogt | Oct. 15, 1946 |